United States Patent [19]

Takeuchi et al.

[11] Patent Number: 4,596,315

[45] Date of Patent: Jun. 24, 1986

[54] DISC BRAKE DEVICE

[75] Inventors: Hiroo Takeuchi, Hideaki Miyake; Yoshito Hanazato, all of Nagano; Kimio Koyana, Saitama, all of Japan

[73] Assignees: Nissin Kogyo Kabushiki Kaisha; Honda Giken Kogyo Kabushiki Kaisha, both of Japan

[21] Appl. No.: 644,408

[22] Filed: Aug. 27, 1984

[30] Foreign Application Priority Data

Aug. 30, 1983 [JP] Japan .................. 58-158185

[51] Int. Cl.[4] ............................................ F16D 65/56
[52] U.S. Cl. .............................. 188/71.9; 188/196 D
[58] Field of Search ............ 188/71.9, 196 D, 196 BA

[56] References Cited

FOREIGN PATENT DOCUMENTS

2307184 11/1976 France ................. 188/71.9

Primary Examiner—Duane A. Reger
Attorney, Agent, or Firm—Wegner & Bretschneider

[57] ABSTRACT

A disc brake device including a piston, an automatic adjuster and a sleeve piston within the cylinder of a caliper body, wherein braking and automatic braking-gap adjustment are achieved by a hydraulic input, and said piston is pushed by a mechanical input through said sleeve piston and said automatic adjuster for braking.

1 Claim, 13 Drawing Figures

DISC BRAKE DEVICE

FIELD OF THE INVENTION

The present invention relates to a disc brake device including within the cylinder of a caliper body an automatic braking-gap adjusting mechanism.

BACKGROUND OF THE INVENTION

With the prior art disc brake device of this type, braking is achieved by hydraulic pressure from a master cylinder in cooperation with a mechanical action from a hand brake lever, etc. To make adjustment in response to the displacement of the piston, an automatic braking-gap adjusting mechanism includes a built-in automatic adjuster comprising a hydraulic chamber defined within the cylinder of the caliper body by the cylinder and the piston, a braking member for engaging the piston to allow the piston to be restrained from rotating but movable in the axial direction, and an adjusting bolt and an adjusting nut to be in multi-threaded engagement therewith, said bolt and nut being disposed within the hydraulic chamber. The adjusting nut is engaged with the piston and thereby restrained from rotating, and is biased in the piston direction by means of a first spring, while the adjusting bolt is rotatable with respect to the cylinder and biased rearwardly of the cylinder by means of a second spring. The adjusting bolt is rotatably engaged at the end thereof in the rear of the cylinder with a push rod. The push rod intersects the adjusting bolt, and is restrained from rotating with respect to a cam shaft rotatably mounted at the rear portion of the cylinder. The rotation of the cam shaft can interchangeably be converted to a propelling force in the braking direction.

In the brake disc device of such a structure, however, there is a large change in the foot pressure to be applied upon the pedal of adjusting the hydraulic pressure, since larger fluctuations in the hydraulic pressure are incurred in the combined hydraulic and mechanical operation than in the hydraulic operation alone. Since the portion of the adjusting bolt to be in engagement with the push rod is exposed to air, there may be a reduction in the service life of a lubricating oil, etc. used in the clutch face defined at the portion where the adjusting bolt abuts upon the push rod, so that the friction resistance of the clutch face is apt to change. Furthermore, a problem arises in connection with the prevention of overadjustment due to the fact that the clutch face is of a small radius.

During charging of a working liquid, the operation of removal of air from the hydraulic chamber is troublesome.

SUMMARY OF THE INVENTION

A main object of the present invention is to provide a disc brake device in which an automatic braking-gap adjusting mechanism is prevented from over-adjustment, friction resistance occurring at a clutch portion of an adjusting bolt is maintained constant, and little or no change in the foot pressure to be applied to the pedal for adjusting a hydraulic pressure occurs between the hydraulic and mechanical operation combination and the single hydraulic operation.

According to the present invention, it is possible to positively prevent over-adjustment of the automatic adjuster and keep the clutch portion in an invarialy lubricating state by a working liquid, so that the friction resistance is kept constant. The reasons are that:

The sleeve piston is non-rotatably and axially movably interposed between the clutch portion of the adjusting bolt and the push rod forming a mechanical mechanism, whereby the clutch portion and the engaging portion are separately disposed before and behind the sleeve piston. In the prior art, both portions are defined by allowing the push rod to abut directly upon the end of adjusting bolt. Thus, the sleeve piston is defined by a larger-diameter portion (facing the clutch) disposed within the hydraulic chamber of the cylinder and a smaller-diameter portion (facing the push rod) disposed within the smaller-diameter portion of the cylinder, so that the clutch portion of the adjusting bolt and the clutch face of the sleeve piston are increased in diameter to obtain a large friction resistance. In the mechanical operation, there is a reduced fluctuation in the hydraulic pressure due to the fact that the sleeve piston moving from the smaller-diameter portion of the cylinder into the hydraulic chamber is of a small value. Thus, even when the mechanical operation is carried out in combination with the hydraulic operation, a change in the footing pressure to be applied upon the pedal is smaller than that occuring in the single hydraulic operation.

In view of the foregoing objects and effects, the present invention provides a disc brake device including a piston, an automatic adjuster, and a sleeve piston within the cylinder of a caliper body, wherein braking and automatic braking-gap adjustment are achieved by a hydraulic input, and said piston is pushed by a mechnical input through said sleeve piston and said automatic adjuster for braking, the improvements comprising:

the cylinder of said caliper body having a larger-diameter portion and a smaller-diameter portion connected thereto, said larger-and smaller-diameter portions fluid-tightly and movably receiving said piston and said sleeve piston, respectively, to define a hydraulic chamber within said cylinder, said automatic adjuster disposed within said hydraulic chamber including an adjusting nut and an adjusting bolt which are engaged with each other in a multi-threaded relation, said adjusting nut being biased in the braking direction by means of a first spring and coming at the end into abutting contact with said piston, whereby said nut is restrained from rotating, and said sleeve piston including a smaller-diameter portion and a larger-diameter portion connected thereto, said larger-diameter portion being disposed to said larger-diameter of said cylinder so that said sleeve piston is restrained from rotating by said cylinder but is movable axially of said cylinder, and said larger-diameter portion being at its end with a clutch face to be in engagement with a clutch portion of said adjusting bolt biased by a second spring in the counter-braking direction and a portion with which said adjusting bolt is rotatably engaged, said engagement portion and a portion of said adjusting bolt to be in engagement therewith being provided with an atmospheric chamber therebetween, and said smaller-diameter portion receiving at the end of said mechanical input.

DETAILED EXPLANATION OF THE PREFERRED EMBODIMENTS

Referring to one embodiment of the present invention illustrated in FIGS. 1 to 4, a caliper body, generally shown at 20, includes a working part 21 and a counter-working part 22 as well as a bridge part 23 for the connection thereof, and is mounted at the bridge part 23 to a bracket 32 in such a manner that it is movable in the axial direction of a brake disc 30. The working part 21 includes a cylinder 40 which is open at its side facing the brake disc 30. The cylinder 40 includes a front portion 41 of a larger diameter and a rear portion 42 of a smaller diameter. Within the larger portion 41 there is a cup-like piston 50 which is movable and fluid-tightly sealed by a piston seal 60, whereby a hydraulic chamber 62 is defined within the cylinder 40. A pressurized fluid is fed into the chamber 62 through an opening 64 communicating with a master cylinder (not shown). The brake disc 30 is provided on its both sides with braking members, i.e., friction pads 66 and 66'. The friction pad 66 facing the cylinder is supported to the bracket 32 in such a manner that it is movable in the axial direction of the disc but restrained from rotating, while the other pad 66' is engaged with the counter-working part 22.

Figure 3:
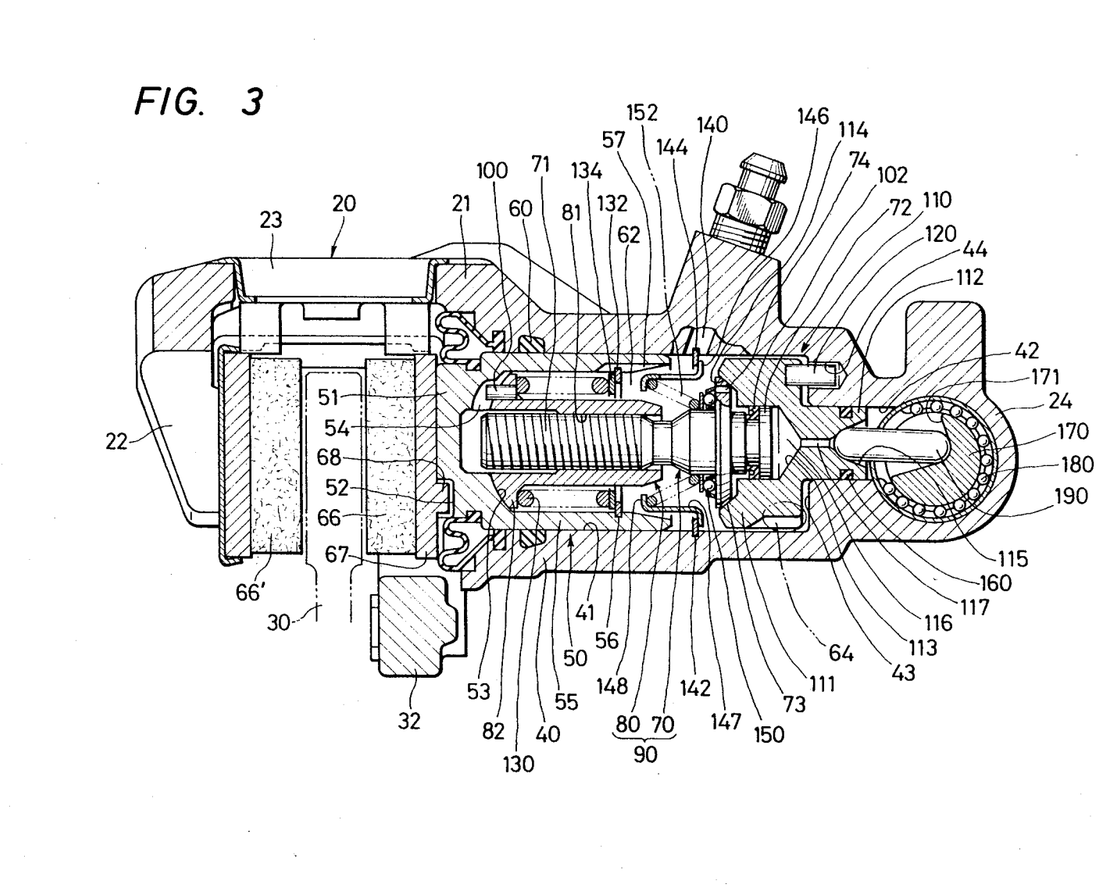
FIG. 3 is a sectional view showing one embodiment of the present invention, which is taken along the line I—I of FIG. 1.

The head 51 of the piston 50 is provided in the front face with a suitable number of recessions 52 which are engaged with projections 68 from the rear plate 67 of the associated pad 66. In this manner, the front face of the head 51 abuts upon the rear plate 67. In accordance with this arrangement, the piston 50 can push the friction pad 66 in the axial direction of the disc, but is restrained from rotating by the pad 66.

Within the hydraulic chamber 62 there is an automatic adjuster 90 including an adjusting bolt 70 and an adjusting nut 80. The adjusting nut 80 is internally multi-threaded at 81, while the adjusting bolt 70 is externally multi-threaded in the shank of a smaller diameter, as shown at 71, both threads being in engagement with each other through small gaps.

A pin 100 is fitted into the head 82 of the adjusting nut 80, and engaged within an air vent groove 54 formed in the bottom 53 of the piston 50, so that the adjusting nut 80 is engaged with the piston 50 while restrained from rotating.

The adjusting bolt 70 is provided at the rear portion 72 with a tapered clutch portion 73 which is bored at 74 for the supply of a working liquid from within the chamber 62. The adjusting bolt 70 also includes its rear end fluid-tightly and rotatably received in a portion 111 of a sleeve piston 110 (to be described later), which has a larger diameter, by means of a cup seal 102.

The sleeve piston 110 is so-called a double piston comprising a portion 111 of a larger diameter and a portion 112 which is connected thereto and of a smaller diameter. The piston 110 is inserted through the cylinder 40 in such a manner that the portion 111 is disposed within the hydraulic chamber 62 of the cylinder 40, while the portion 112 is disposed within the cylinder portion 42. A pin 120 inserted into the bottom of the rear end of the cylinder 40 is fitted into a locking hole 44 formed in the bottom 43 of the rear end of the larger-diameter portion 41 of the cylinder 40 in the axial direction of the cylinder, so that the sleeve piston 110 is movable in the axial direction of the cylinder 40, while restrained from rotating.

The larger-diameter portion 111 of the sleeve piston 110 is provided at the end face with a hollow cylinder 113 which is fitted over the rear portion 72 of the adjusting bolt 70, and tapered at the edge of the opening thereof to define a clutch face 114.

A first spring 130 is wound around the shank portion of the adjusting nut 80, and has one end engaged with the head 82 of the adjusting nut 80 and the other end engaged with a seat stopper 132 through a spring seat 134, said stopper being fitted into an annular groove 56 formed in the inner periphery of the cylinder portion 55 of the piston 50. In such an arrangement, the adjusting nut 80 is biased toward the head 51 of the piston 50, while the front face of the head 82 thereof abuts upon the inner face of the piston 50. The cylindrical portion 55 of the piston 50 includes in the inner face an air discharge groove 57 in the axial direction of the piston and across the annular groove 56, said groove 57 being deeper than said groove 56. This facilitates discharge of an amount of air remaining on the inner face of the piston 50 during assembling.

The hydraulic chamber 62 includes therein a bleeder hole 140 and, across the opening of said bleeder hole 140, a groove 142 is formed in the inner face of the larger-diameter portion 41 of the cylinder 40. The groove 142 is fitted therein with a ring-like retainer stopper 144 to which a flange portion 146 is secured to hold a retainer 147 in place.

A conical second spring 152 has the end of its larger-diameter portion secured to a leading flange portion 148 of the retainer 147 and the end of its smaller-diameter portion engaged with the rear portion 72 of the adjusting bolt 70 through a bearing 150, so that the bolt 70 is biased rearwardly of the cylinder 40.

The sleeve piston 110 is provided over the smaller-diameter portion 112 with a seal ring 160 which is fluid-tightly and slidably fitted into the smaller-diameter portion 42 of the cylinder.

On the side opposite to the hydraulic chamber 62 of the smaller-diameter portion 42 of the cylinder, a rear wall 24 in the form of a cylinder is formed as an integral piece with the working part 21 in such a manner that it intersects said smaller-diameter portion 42, and communicates with said smaller-diameter portion 42. A cam shaft 170 is rotatably inserted in the rear wall 24 through a bearing 180.

A push rod 190 is interposed between a conical recession 115 formed in the end face of the smaller-diameter portion 112 of the sleeve piston 110 and a cam groove 171 formed in the axial direction of the cam shaft 170. The push rod 190 has its both ends formed into a spherical shape, and is pushed by rotation of the cam shaft 170 to give a push to the sleeve piston 110 in the braking direction.

In the deepest portion of the conical recession 115 in the sleeve piston 110, into which one end of the push rod 190 is fitted, an air communication hole 117 is defined, which is in communication with an atmospheric chamber 16 within the hollow cylinder 113 of said larger-diameter portion 111. This hole 117 serves as an air vent hole when the rear portion 72 of the adjusting bolt 70 is fitted in place. It is understood that the inner diameter of the smaller-diameter portion 42 of the cylinder is equal to or larger than that of the hollow cylinder 113 of the sleeve piston 110.

A lever 200 is secured to the cam shaft 170 by a nut 202. When the lever 200 is rotated in the direction A in FIG. 4, the cam shaft 170 rotates counterclockwise in FIG. 3 to put on the brakes. When the brakes are taken off, the lever 200 is rotated in the direction B by a return spring 204 to the initial position.

It is noted that reference numeral 206 stands for a sliding pin which is mounted to an arm portion 25 of the caliper body 20 by a bolt 208 so as to support slidably the caliper body 20.

In what follows, the action of the first embodiment of the present invention will be explained.

A pressurized liquid is introduced from the master cylinder to the hydraulic chamber 62 through the hole 64. The piston 50 then moves left in FIG. 3 to engage one friction pad 66 with one side of the disc 30, whereby the caliper body 20 moves under the reaction in the counterdirection, i.e., in the right direction. In consequence, the other friction pad 66' is engaged with the other side of the disc 30 by the counter-working part 22 for braking.

At this time, the advancement of the piston 50 causes the adjusting nut 80 to move together therewith by the first spring 130. However, since the amount of movement of the nut 80 is then corresponding to the amount of backlash between the internal multi-thread 81 of the nut 80 and the external multi-thread 71 of the bolt 70, which are in engagement with each other, any axial force is not exerted upon the engagement of the multi-threads. Braking is then achieved with no generation of any torque and, hence, no rotation of the adjusting bolt 70.

If the brakes are put on when the friction pads 66 and 66' wear away to such an extent that the braking gap exceeds the given value, the amount of movement of the piston 50 exceeds the amount of backlash between the multi-threads of the adjusting nut 70 and bolt 80. The adjusting nut 80 and bolt 70 then advance as an integral piece, so that the clutch portion 73 of the adjusting bolt 70 tends to move away from the clutch face 114 of the sleeve piston 110. In this state, since air is admitted from the air communication hole 117 in the sleeve piston 110, that clutch portion moves smoothly away from that clutch face. At the same time, an axial force is exerted upon the engagement of the multi-threads by a hydraulic pressure within the hydraulic chamber 62, thereby rotating the adjusting bolt 70. This causes the automatic adjuster 90 to be extended, so that the clutch portion 73 of the adjusting bolt 70 is again engaged with the clutch face 114 of the larger-diameter portion 111 of the sleeve piston 110, whereby the braking gap is automatically adjusted. When the automatic adjuster 90 extends, and the clutch portion 73 of the adjusting bolt 90, while rotating, comes into sliding contact with the clutch face 114 of the larger-diameter portion 111 of the sleeve piston 110, a large friction resistance is obtained due to the larger diameter of the clutch face 114, so that the rotation of the adjusting bolt 70 is stopped in a moment for the positive prevention of over-adjustment. When the supply of a pressurized liquid is interrupted, and a master cylinder piston (not illustrated) returns to the initial position under the action of the return spring, the hydraulic pressure within the hydraulic chamber 62 drops, so that the piston 50 tends to be restored to the original position by the piston seal 60. However, such movement of the piston 50 is restricted by the automatic adjuster 90 to keep the braking gaps between the disc 30 and the pads 66 and 66' constant in an invariable and automatic manner.

Reference will now be made to hand braking.

Figure 1:
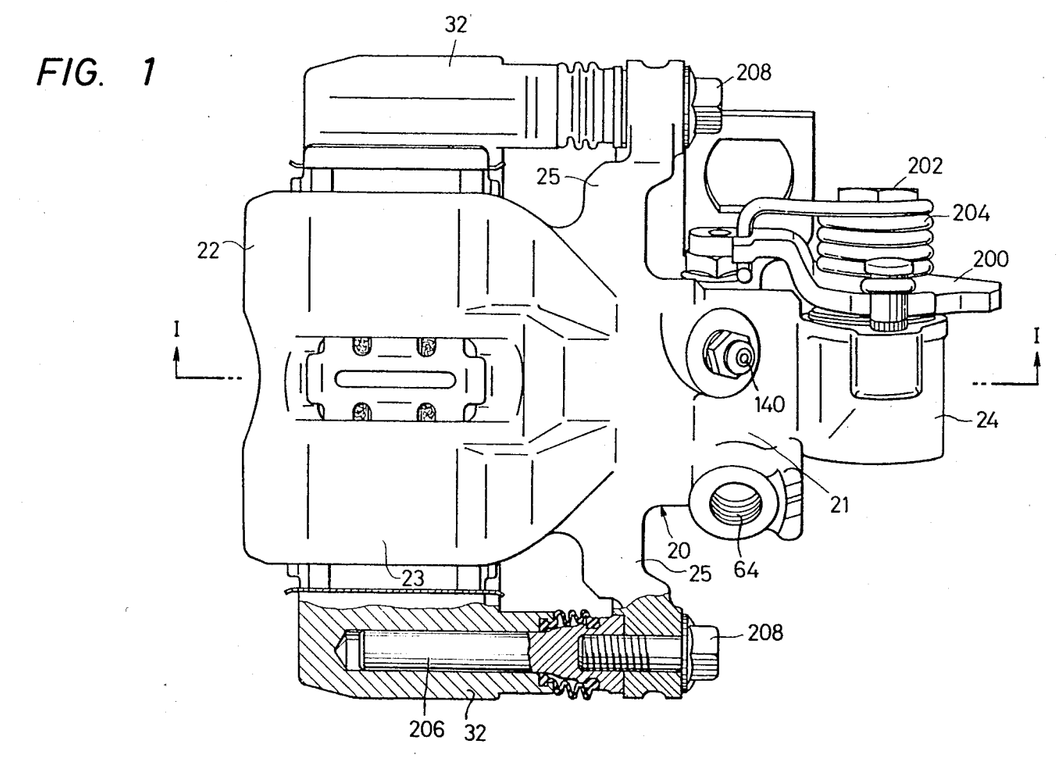
FIG. 1 is a plan view showing the disc brake device of the present invention.
Figures 2, 4:
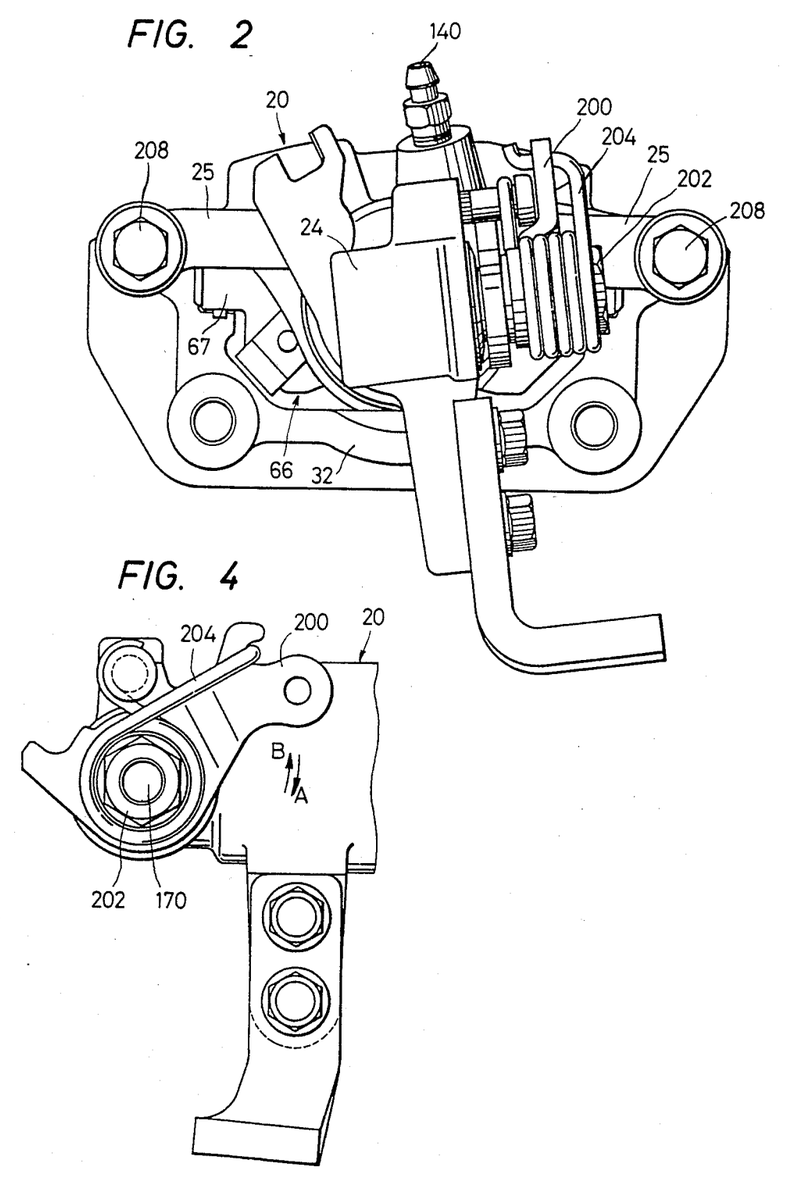
FIG. 2 is a side view of the device of FIG. 1.
FIG. 4 is a side view showing the portion to which the cam shaft is mounted.

Pulling a hand brake lever (not shown) causes rotation of the lever 200 in the direction A in FIG. 4. The cam shaft 170 rotates counterclockwise in FIG. 3, and the push rod 190 is pushed out left, whereby the piston 50 is pushed by the automatic adjsuter 90 through the sleeve piston 110, and advances left. Thus, one friction pad 66 is engaged with one side of the disc 30, and the caliper body 20 is moved under the reaction in the counter-direction, i.e., in the right direction to engage the other friction pad 66' with the other side of the disc 30, thereby putting on the hand brakes.

In this state, when one spherical end of the push rod 190 allows the sleeve piston 110 to be engaged with the rear portion 72 of the adjusting bolt 70, no rotation of the adjusting bolt 70 takes place, since there is an increase in the friction resistance between the clutch face 114 of the sleeve piston 110 and the clutch portion 73 of the adjusting bolt 70. Accordingly, there is no change in the engagement of the multi-threads of the adjusting nut 80 and bolt 70, so that braking is mechanically achieved without contraction of the automatic adjuster 90.

Figure 5:
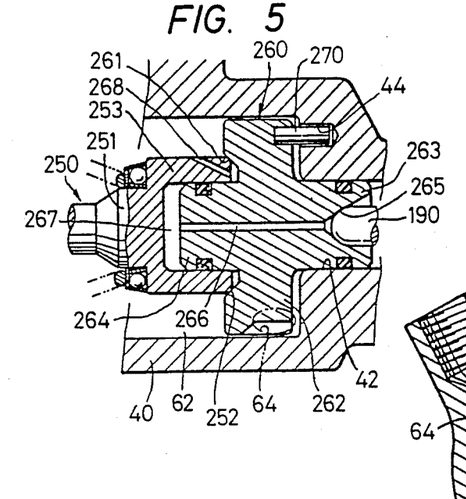
FIG. 5 is a sectional side view showing part of another embodiment of the present invention.

Referring to FIG. 5 illustrative of another embodiment of the present invention, there is disposed an adjusting bolt 250 forming part of the adjusting mechanism for the hydraulic chamber 62 of the cylinder 40. A reaction portion 251 of the adjusting bolt 250 is provided on the peripheral edge of its end with a hollow cylinder 253 including a clutch portion 252 to be in engagement with a clutch face 261 of a sleeve piston 260 to be described later.

The sleeve piston 260 has a larger-diameter portion 262 disposed within the aforesaid hydraulic chamber 62 and a smaller-diameter portion 263 placed in the smaller-diameter portion 42 of the cylinder. That larger-diameter portion 262 is provided at the peripheral edge of its end face with a tapered clutch face 261 to be in engagement with a clutch portion 252 of the adjusting bolt 250, and at the center with a piston portion 264 to be slidably fitted into the hollow portion of the aforesaid cylindrical portion 253. Since a pin 270 is provided in the larger-diameter portion 262, that portion is restrained from rotating, but is axially movable. Further, the smaller-diameter portion 263 is fluid-tightly inserted within the smaller-diameter portion 42 of the cylinder by means of a seal ring 272, and provided on its end face with a conical recession 265, upon which the push rod 190 abuts. The conical recession 265 is formed in the central bottom with an air communication hole 266 extending to the end face of the piston portion 264, and an atmospheric pressure chamber 267 defined by the piston portion 264 of the sleeve piston is disposed in communication within the hollow cylinder portion 253 of the adjusting bolt 250. A part of the chamber 267 facing that recession 265 is closed up by the push rod 190. That chamber 267 is also maintained fluid-tight by a seal ring 274 inserted into the piston portion 264. Thus, this embodiment operates in the same manner as in the first embodiment. It is noted that reference numeral 268 stands for a communication hole in the sleeve piston 260.

In the 3rd to 5th embodiments of the present invention, a pressurized liquid supply chamber is defined between the bottom of the rear end of the cylinder and the barrel portion of thereof including a larger-diameter portion and a smaller-diameter portion contiguous thereto, and the supply chamber is provided therein with an opening for the introduction of a working liquid from a hydraulic pressure generating source. Communication is made between the supply chamber and the hydraulic chamber through a peripheral gap defined between the inner wall of the cylinder and larger-diameter portion thereof, whereby it is possible to positively discharge through a bleeder hole an amount of air entrained in the working lqiuid supplied through said opening and present in the gap between the inner wall of the cylinder and the larger-diameter portion of the sleeve piston.

Figure 6:
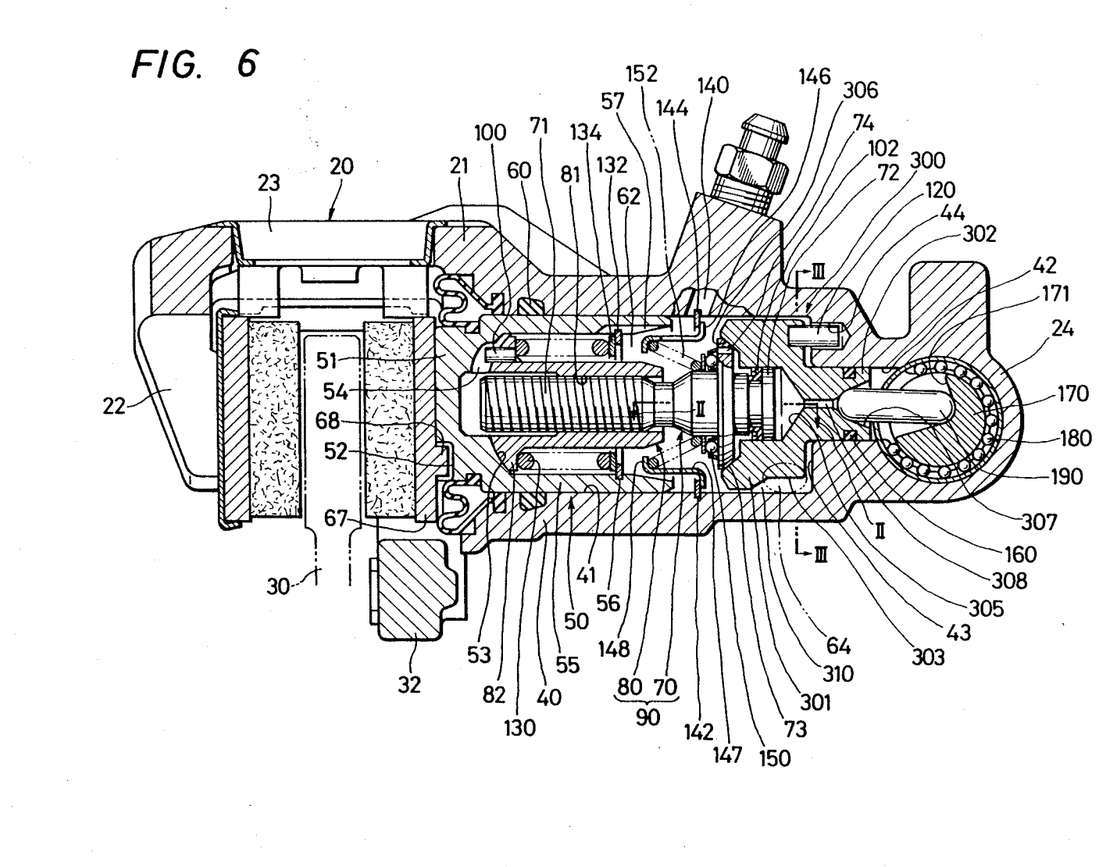
FIG. 6 is a sectional view showing a third embodiment of the present invention, which is taken along the line I—I of FIG. 1.
Figure 7:
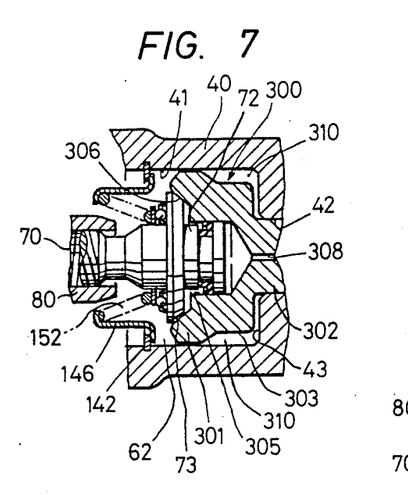
FIG. 7 is a sectional view taken along the Line II—II of FIG. 6.
Figure 8:
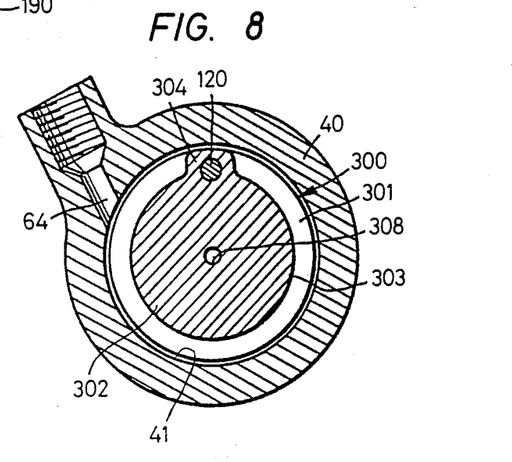
FIG. 8 is a sectional view taken along the line III—III of FIG. 6.

The third embodiment of the present invention will now be explained with reference to FIGS. 6 to 8.

A sleeve piston 300 has a larger-diameter portion 301 disposed within the hydraulic chamber 62 of the cylinder 40 and a smaller-diameter portion 302 fluid-tightly and movably fitted into the smaller-diameter portion 42 of the cylinder by means of a seal ring 160. A barrel portion 303 for connecting the larger-diameter portion 301 with the smaller-diameter portion 302 has a diameter smaller than that of 301 but larger than that 302. A pressurized liquid supply chamber 310 is defined between the barrel portion 303 and the rear end bottom 43 of the cylinder 40. The supply chamber 310 communicates with the hydraulic chamber 62 through a gap between the inner wall of the cylinder 40 and the larger-diameter portion 301 of the sleeve piston 300. That chamber 310 is also provided therein with the opening 64 for supplying a pressurized liquid from a master cylinder (not shown). The sleeve piston 300 is restrained from rotating but slidable in the axial direction of the cylinder 40 by fitting a pin 120 into a hole 44 formed in the rear end bottom 43 of the larger-diameter portion 41 in the axial direction of the cylinder, said pin 120 being provided in the rear end of a sliding guide portion 304 facing the cylinder 40, which terminates in the supply chamber 310.

The larger-diameter portion 301 of the sleeve piston 300 is provided at the end face with a hollow cylinder portion 305 to be fitted over the rear portion 72 of the adjusting bolt 70, said portion 305 including at its opening edge a tapered clutch face 306.

A push rod 190 is interposed between an conical recession 307 formed on the end face of the smaller-diameter portion 302 of the sleeve piston 300 and a cam groove 171 formed axially of the cam shaft 170.

In the deepest portion of the conical recession 307 there is an air communication hole 308 for making communication with the hollow cylinder 305 of the larger-diameter portion 301. That hole 308 is closed up on the side facing the recession 307 so as to prevent dust from entering through the working end of the push rod 190.

Figure 9:
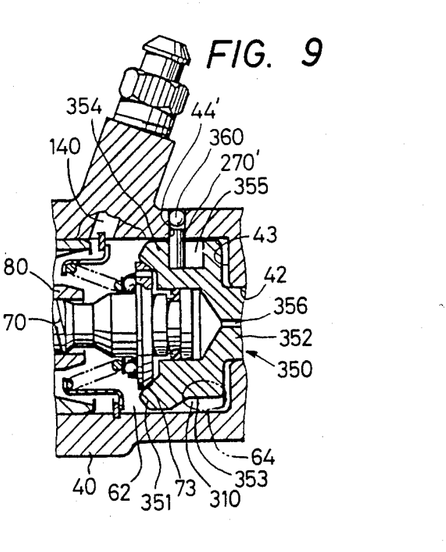
FIG. 9 is a sectional view showing part of a fourth embodiment of the present invention.
Figures 10, 12, 13:
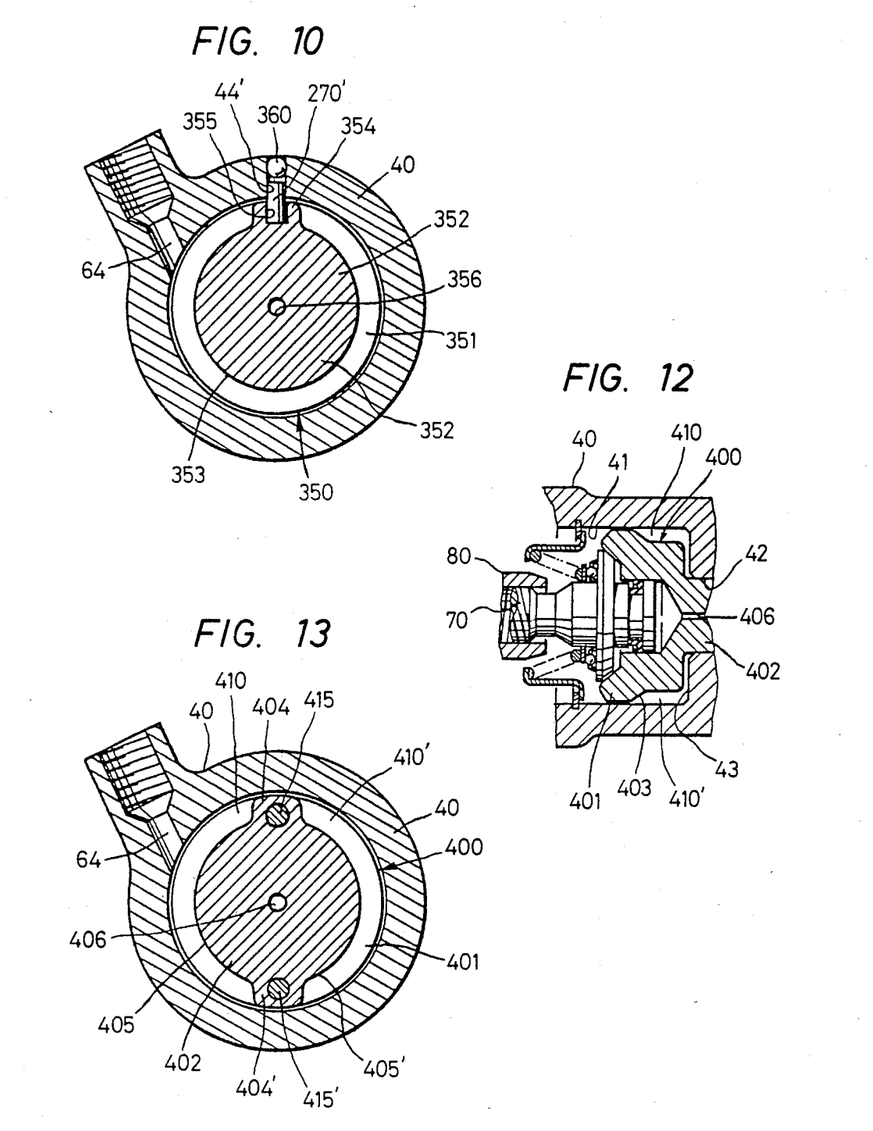
FIG. 10 is a sectional side view of FIG. 9.
FIG. 12 is a sectional view taken along the line IV—IV of FIG. 10.
FIG. 13 is a sectional view taken along the line V—V of FIG. 10.

The fourth embodiment of the present invention is illustrated in FIGS. 9 and 10. This embodiment is a variation of the third embodiment of the present invention, wherein a sleeve piston 350 has a larger-diameter portion 351 disposed within the hydraulic chamber 62 and a smaller-diameter portion 352 inserted into the smaller-diameter portion 42 of the cylinder 40, a barrel portion 353 for the connection thereof has a diameter smaller than that of 351 but larger that of 352, and a pressurized liquid supply chamber 310 is defined between the barrel portion 353 and the rear end bottom 43 of the cylinder 40.

A guide groove 355 extending axially of the cylinder is formed in a sliding guide portion 354 terminating in the supply chamber 310, and a pin 270' is fitted and fixed in a through-hole 44' which is formed in the inner wall of the cylinder 40 and intersects the axial direction of the cylinder. The sleeve piston 350 is restrained from rotating but slidable axially of the cylinder by slidably fitting the end of the pin 270' into the guide groove 355. It is noted that reference numerals 356 and 360 stand for an air communication hole and a steel ball for sealing the through-hole 44', respectively.

Figure 11:
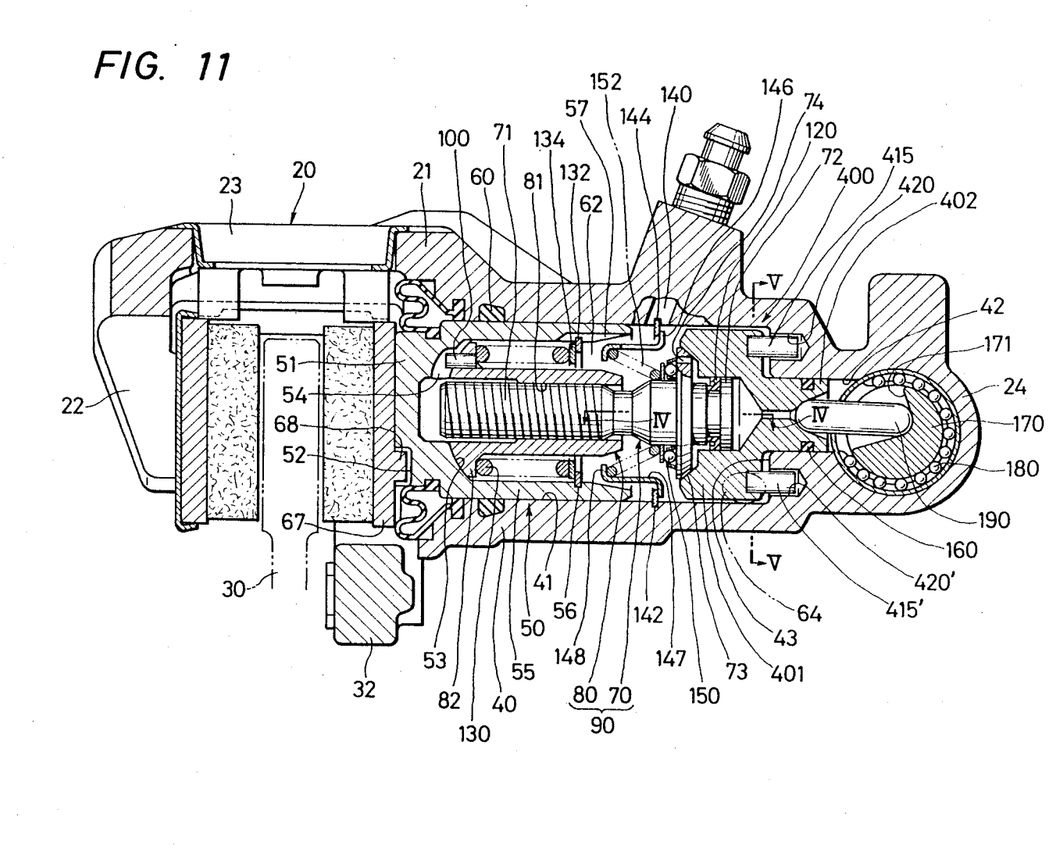
FIG. 11 is a sectional view showing a fifth embodiment of the present invention, which is taken along the line I—I of FIG. 1.

FIGS. 11 to 13 show the fifth embodiment of the present invention, wherein a sleeve piston 400 has a larger-diameter portion 401 disposed within the hydraulic chamber 62 and a smaller-diameter portion 402 inserted into the smaller-diameter portion 42 of the cylinder 40, a barrel portion 403 for the connection thereof is provided therein with arcuate grooves 405 and 405', leaving pin-mounting portions 404 and 404', and pressurized liquid supply chambers 410 and 410' are defined between the grooves 405 and 405' and the rear end bottom 43 of the cylinder 40, said chambers being provided therein with openings 64 for the introduction of a pressurized liquid.

The sleeve pieston 400 is restrained from rotating but movable axially of the cylinder by engaging the pins 415 and 415' mounted in the portions 404 and 404' within holes 420 and 420' formed in the rear end bottom 43 of the cylinder 40 in the axial direction thereof. It is noted that reference numeral 406 stands for an air communication hole.

It is understood that the present invention is not limited to the foregoing embodiments, and many modifications and changes may be made without departing from the scope and spirit of the invention.

What is claimed is:

1. An improved disk brake device including a piston, an automatic adjuster and a sleeve piston within the cylinder of a caliper body, wherein braking and automatic braking-gap adjustment are achieved by a hydraulic input, and said piston being pushed by a mechanical input through said sleeve piston and said automatic adjuster for braking, the improvements comprising;
the cylinder of said caliper body having a larger-diameter portion and a smaller-diameter portion connected thereto, said larger and smaller-diameter portions fluid-tightly and movably receiving said piston and said sleeve piston, respectively, to define a hydraulic chamber within said cylinder;

said automatic adjuster disposed within said hydraulic chamber including an adjusting nut and an adjusting bolt which are engaged with each other in a multi-threaded relation, said adjusting nut being biased in the braking direction by means of a first spring abutting said piston, whereby said nut is restrained from rotating;

said sleeve piston including a smaller-diameter portion and a larger-diameter portion connected thereto, said larger-diameter portion being disposed to said larger-diameter of said cylinder so that said sleeve piston is restrained from rotating by said cylinder but is movable fluid-tightly and axially of said cylinder so as to maintain said hydraulic chamber, and said larger-diameter portion being at its end with a clutch face to be in engagement, within said hydraulic chamber, with a clutch portion of said adjusting bolt biased by a second spring in the counter-braking direction and a portion with which said adjusting bolt is rotatably engaged, said engagement portion and a portion of said adjusting bolt to be in engagement therewith being provided with an atmospheric chamber therebetween, and said smaller-diameter portion cooperating with said mechanical input.

* * * * *